United States Patent Office 3,677,861
Patented July 18, 1972

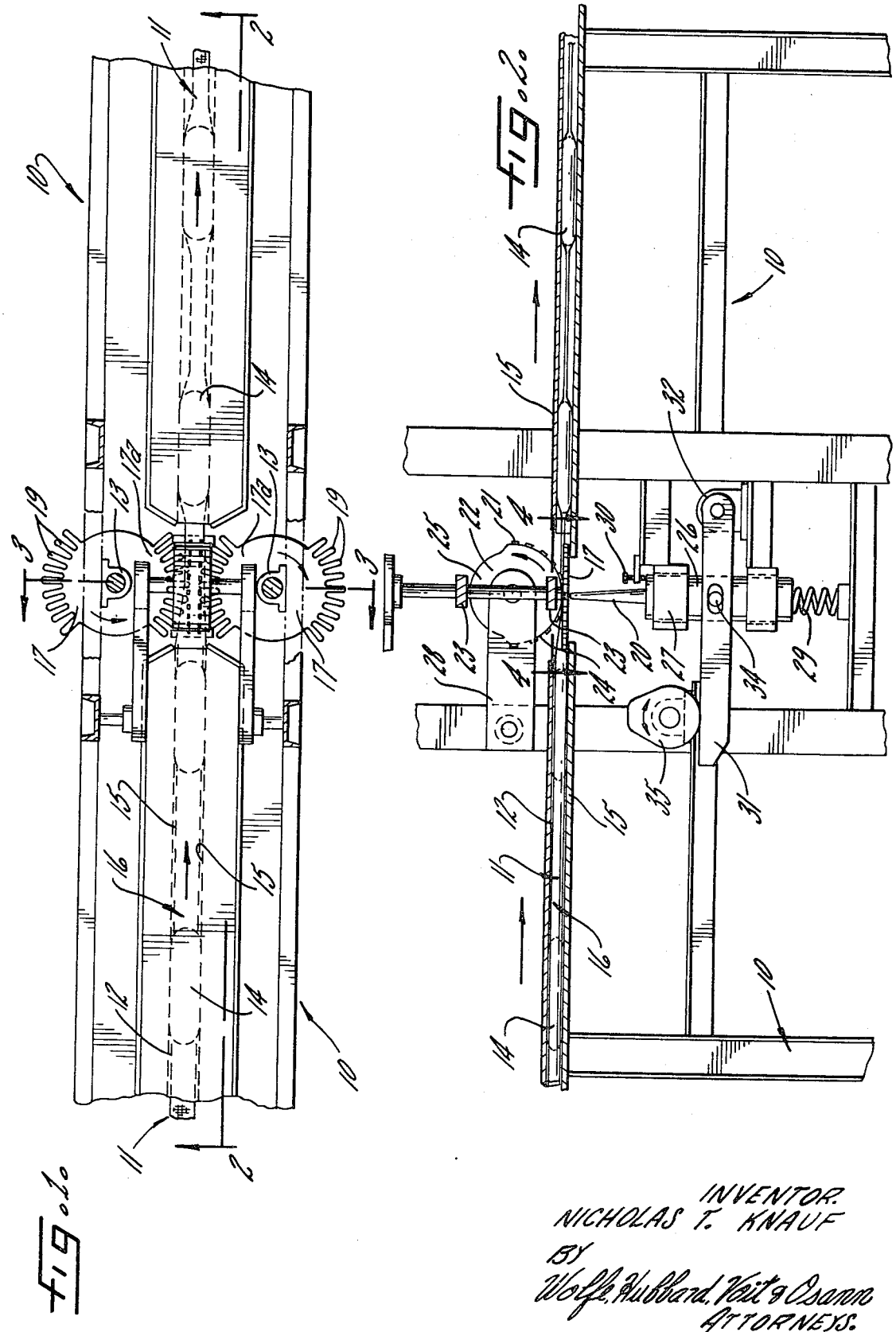

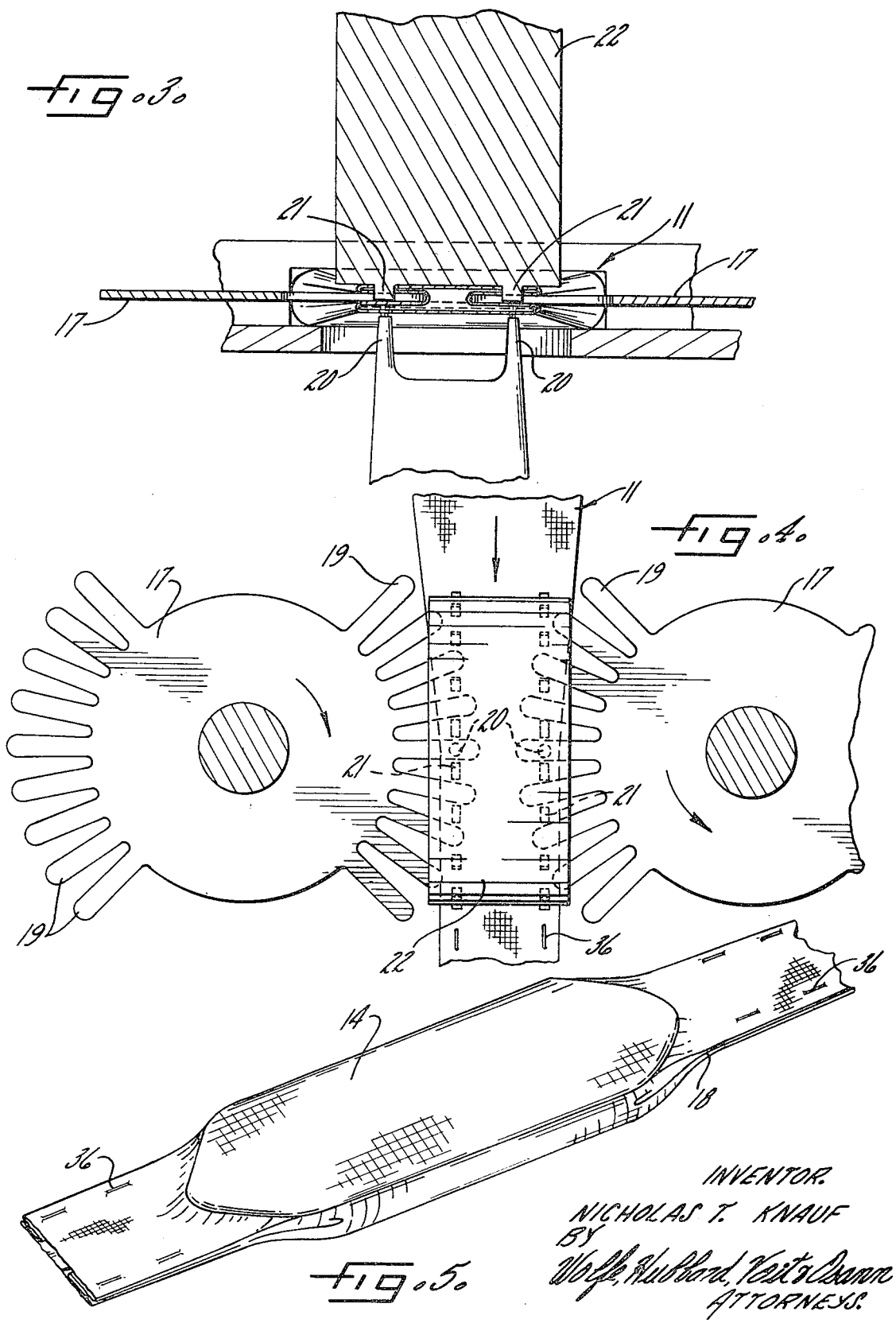

3,677,861
APPARATUS FOR PLEATING AND ULTRA-
SONICALLY SEALING SANITARY NAPKIN
TAB ENDS
Nicholas T. Knauf, Neenah, Wis., assignor to Kimberly-
Clark Corporation, Neenah, Wis.
Filed Dec. 8, 1969, Ser. No. 882,813
Int. Cl. B32b 31/10, 31/20
U.S. Cl. 156—380                                                                       4 Claims

ABSTRACT OF THE DISCLOSURE

An apparatus for simultaneously tuck-inpleating and heat sealing the tab ends of sanitary napkins using rotatably driven tucking fingers, an ultrasonic sealing horn and associated anvil which mesh with the tucking fingers.

BACKGROUND OF THE INVENTION

This invention relates generally to the manufacture of sanitary napkins, and more particularly concerns an improved apparatus and method for tuck-inpleating and sealing the pad wrapper of a sanitary napkin to provide tab ends for fastening purposes.

An apparatus and method for simultaneously tuck-inpleating and heat sealing a linearly moving tube of wrapper material to provide the tab ends of sanitary napkins is described in the copending application of Thomas H. Planner, Ser. No. 882,868, filed Dec. 8, 1969, and assigned to the assignee of the present invention. The apparatus described in said copending application of Thomas H. Planner embodies inpleat devices and heated sealing devices meeting the wrapper material simultaneously for bonding together the folds of inpleat as it is formed. As the tuck-inpleating and sealing are done simultaneously there is not opportunity for a previously formed inpleat to become distorted before sealing is attempted. The tab ends so simultaneously inpleated and folded are, therefore, uniform.

The present invention relates to an alternative apparatus and method for simultaneously tuck-inpleating and sealing the tab ends of sanitary napkins. In this instance the apparatus and method find particularly advantageous use when the pervious pad wrapper of the sanitary napkin includes synthetic plastic fibers such as polypropylene, polyethylene, and the like.

Accordingly, it is a primary aim of the invention to provide a method and apparatus for simultaneously performing the tuck-inpleating and sealing steps in the high speed manufacture of sanitary napkins from pad wrapper material including thermoplastic fibers. A related object is to provide a method and apparatus of the above kind that reliably forms sanitary napkins with uniform tucked and sealed end tabs.

Another object is to provide an apparatus as characterized above that can be operated at high speed with little vibration. A further object is to provide such an apparatus which, once properly set up, remains exactly synchronized with respect to its own cooperating parts as well as the remainder of the sanitary napkin assembly machinery.

Other objects and advantages will become apparent as the following description proceeds, taken in conjunction with the accompanying drawings, in which:

FIG. 1 is a fragmentary top elevation of an apparatus embodying the present invention;

FIG. 2 is a section taken approximately along line 2—2 of FIG. 1;

FIG. 3 is an enlarged section taken approximately along line 3—3 of FIG. 1;

FIG. 4 is an enlarged section taken approximately along line 4—4 of FIG. 2;

FIG. 5 is a fragmentary perspective of a sanitary napkin that has been pleated and sealed in accordance with the present invention.

While the present invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention.

DESCRIPTION OF THE INVENTION

Turning now to the drawings, there is illustrated in FIG. 1 the pleating and sealing portion of an apparatus 10 for making sanitary napkins from a linearly moving tube 11 comprising a fluid pervious pad wrapper 12 and having pads made of a fluid absorbent wadding 14 arranged inside of tube 11 at pre-determined and equally spaced intervals. The tube 11 moves into the pleating and sealing section indicated generally at 13 from the left and exits to the right. As the tube 11 passes through the pleating and sealing section 13, it is guided from any up, down or sideways displacement by bottom, top and side plate 15, which form a rectangular channel through which the moving tube 11 passes. The tube portions between the spaced absorbent pads 14, generally indicated at 16, are inpleated and sealed to form the flat tab ends of the sanitary napkin.

In accordance with the invention, the flat tab ends of a sanitary napkin are tuck-inpleated and sealed simultaneously by a pair of tucking devices in the form of generally circular discs 17 positioned on either side of the moving tube 11 which fold an inpleat 18 (FIG. 5) in opposed walls of the tube portions 16 between the spaced pads 14, and an ultrasonic sealing device, with two active sealing areas or tip ends, in the form of an ultrasonic transducer horn 20 and cooperating anvil 21 positioned at about 90-degree angles from the tucking devices for bonding together the folds of the inpleat 18 as it is being formed by the tucking devices.

The tucking discs 17 are located perpendicular to the centerline of the rectangular channel formed by the side plates 15, shown in FIG. 1, and are parallel to, and on the horizontal centerline of this rectangular channel as shown in FIG. 2. The tucking discs 17 are mounted on the frame by means of brackets 23 and are rotatably driven on a vertical axis in the directions shown by the arrows 17a. Since the discs 17 rotate constantly and at a uniform rate relative to the speed of the tube 11, little or no jarring or vibration is created that might cause the folded inpleat to pull apart or slip.

Each disc 17 has a plurality of finger-like projections 19, extending around a portion of the disc, which perform the inpleating function. In the preferred embodiment of the invention each disc 17 has two groups of projections disposed about 180° around the disc from each other. These finger-like projections 19 crease and fold an inpleat of the desired configuration in opposed walls of the tube portions 16 as the tucking discs 17 rotate. The peripheral speed of the fingers 19 is adjusted to equal the linear speed of tube 11 so that there is no relative speed differential between the tube 11 and the tucking finger projections 19. This feature is desirable so that sealing of the inpleat can be performed in the space between the fingers 19 as will be subsequently described. The groups of projections are spaced so that the pads 14 pass the rotating discs 17 without being contacted by the projections 19.

In the preferred embodiment a sealing roll 22 is located immediately above the disc 17. The axis of this cam-shaped roll is perpendicular to the centerline of the rectangular tube formed by plates 15 (see FIG. 2) and is parallel to the disc 17 (see FIG. 1). This sealing roll 22 is mounted so that its major diameter just clears the tucking fingers 19 of the disc 17, and extending outward from the major diameter of the roll are button-like projections that form anvils 21. These anvil butons 21 project outwardly equal to just more than the thickness of disc 17, and are spaced radially on the roll 22 so that they fit between the fingers 19 of the disc 17. The sealing roll 22 is journaled on brackets 28 so that its major diameter 24 just clears the fingers 19 of the tucking discs 17, and is rotatably driven at a constant rate in the direction of the arrow 22a. The roll 22 is made to rotate in time with the moving tube 11, and so that it moves through one revolution during the time one body piece 14 moves by the tucking discs 17. The surface speed of the sealing roll 22 is equal to the speed of the tube 11 moving past it.

The minor diameter 25 of the cam shaped sealing roll 22 is of such a magnitude that it allows the fluid absorbent pads 14 to pass between the sealing roll 22 and the horn 20 without being compressed or displaced.

Located immediately below the disc 17 is an ultrasonic sealing horn 20 and its related transducer 26. This assembly is arranged so that the transducer 26 and the horn 20 can be displaced in a vertical direction, sliding up or down in fixed guide bearings 27. The transducer 26 has constant pressure applied to it by means of a spring 29 so as to raise the unit against an adjustable fixed stop 30. The stop 30 is adjusted so that the transducers 26 and sealing horn 20 can just contact the anvil buttons 21 on the sealer roll 22 but will not let the horn 20 touch the tucking fingers 19 as they rotate. A link bar 31 pivotable around a fixed fulcrum 32 at one end and attached to the transducer 26 through a pin 34 near its mid-point, will transmit an up and down motion to the transducer 26 and horn 20, whenever the free end of the link is moved. A cam 35 is mounted above the free end of the link 31 such that the motion of the cam 35, when it is rotated causes the transducer 26 to move down or up depending upon the position of the cam surface 35. This cam 35 is timed so as to rotate one revolution during the time one pad 14 moves past the tucking discs 17.

The cam 35 is constructed and timed so as to lower the ultrasonic horn 20 away from the tucking disc 17 to let the pad 14 clear the end of the horn 20. As the cam 35 continues to turn, the spring 29 returns the transducer 26 to the fixed stop 30 with the horn 20 in a position to seal the pad wrapper against the anvil buttons 21, just after the pad 14 passes the horn 20. This cycle is repeated again and again, with the tuck sealed fabric and pads exiting to the right.

As the horn 20 contacts the pad wrapper and presses the pad wrapper between it and the anvil 21 in the heating zone between the tucking fingers 19, ultrasonic energy is applied to the horn causing it to vibrate at a high frequency and produce intense vibration of the fibers of the pad wrapper material in the heating zone. This vibration of the fibers produces heat due to the effect of friction as the fibers rub against each other, and causes the thermoplastic fibers in the pad wrapper to soften as their temperature is raised. The sonic energy from the horn 20 should be controlled to raise the temperature of the fibers within the heating zone to a point near but under the crystalline melting temperature of the polymer from which the thermoplastic fibers are formed, so that these fibers will be caused to self bond without melting, charring, or burning them or the other pad wrapper fibers.

After the thermoplastic fibers have cooled, the bonded area 36 formed between the folds of the inpleat 18 looks like a small weld mark (see FIG. 5). In the preferred embodiment of the invention, the distance between each such "bond" is about ¾ inch and each bond is about ½ inch in length and about 1/16 inch width.

In a later operation, the portion 16 are severed so as to define individual napkins with uniformly tucked inpleated and sealed ends. The method and apparatus described above produces such uniform ends since the tucking and sealing operation is performed simultaneously. There is no opportunity for a previously formed inpleat to become distorted before sealing is attempted.

The sealing roll 22 with anvil buttons 21 create little vibration even when operated at high speeds since they are uniformly rotated in one direction. This also insures proper synchronization and cooperation of the tucking and sealing devices since, once properly set up, a common drive to the devices precludes lack of synchronization.

I claim as my invention:

1. In an apparatus for making flat tab ends on sanitary napkins from a linearly moving tube of fluid pervious wrapper material, including thermoplastic fibers, containing linearly spaced pads of fluid absorbent material, the combination comprising, a pair of tucking devices positioned on either side of said moving tube, each said tucking device having a plurality of spaced fingers that engage and fold inpleat in opposed walls of the tube portions between said spaced pads, and an ultrasonic sealing device having tube engaging and ultrasonic sealing elements positioned at about a 90-degree angle from said tucking devices so that said tube engaging and ultrasonic sealing elements of said ultrasonic sealing device mesh with the spaced fingers of said tucking devices to thereby engage said folded inpleat and ultrasonically bond together the folds of said inpleat in the spaces between said fingers.

2. The combination of claim 1 wherein said ultrasonic sealing device is a pair of ultrasonic horns and cooperating anvils positioned at about a 90-degree angle from said tucking devices so that said ultrasonic horns and cooperating anvils mesh with the spaced fingers of said tucking devices to thereby engage said folded inpleat and ultrasonically bond together the folds of said inpleat in the spaces betwen said fingers.

3. The combination of claim 1 in which said tucking devices are generally circular and rotatably driven so that said fingers engage and move with said moving tube, said fingers being disposed around only a portion of the periphery of said rotatable tucking device so that the fingers will engage and fold an inpleat in opposed walls of said moving tube portions only between said spaced pads, and said ultrasonic sealing device having tube engaging and ultrasonic sealing elements positioned at about a 90-degree angle from said tucking devices so that said tube engaging and ultrasonic sealing elements fit between said spaced fingers to mesh with the said spaced fingers of said tucking devices to bond together the folds of said inpleat, in the spaces between said fingers.

4. The combination of claim 3 in which said tube portions between said spaced pads include thermoplastic fibers, and said ultrasonic sealing device elements comprise an ultrasonic transducer horn and cooperating anvil for heating said tube portions to raise the temperature of said thermoplastic fibers to just under the crystalline melting temperature of the polymer from which said thermoplastic fibers are formed and soften said thermoplastic fibers and thereby bond together the folds of said inpleat in the spaces between said fingers.

References Cited

UNITED STATES PATENTS

| 3,020,599 | 2/1962 | Pukis et al. | 128—290 R |
| 3,419,447 | 12/1968 | Hewitt | 156—73 |
| 3,517,479 | 6/1970 | Pinkham | 53—182 |

BENJAMIN A. BORCHELT, Primary Examiner

J. V. DORAMUS, Assistant Examiner

U.S. Cl. X.R.

53—28; 156—73